United States Patent [19]
Ansari et al.

[11] Patent Number: 5,645,783
[45] Date of Patent: Jul. 8, 1997

[54] APPARATUS AND METHOD FOR MOLDING GRINDING WHEELS

[76] Inventors: Naseem A. Ansari; Omar R. Ansari, both of 4811 Dusharme Dr., Minneapolis, Minn. 55429-3940

[21] Appl. No.: 635,029

[22] Filed: Apr. 19, 1996

[51] Int. Cl.$^6$ .................................................. B29C 43/18
[52] U.S. Cl. ........................... 264/112; 264/109; 425/406; 425/410
[58] Field of Search ................................ 264/109, 112, 264/122; 425/406, 410

[56] References Cited

U.S. PATENT DOCUMENTS

| 2,582,922 | 1/1952 | Crowley | 425/410 |
| 2,830,320 | 4/1958 | Geppert | 425/410 |

Primary Examiner—Mary Lynn Theisen
Attorney, Agent, or Firm—D. L. Tschida

[57] ABSTRACT

Molding apparatus including a thermally transmissive mold liner and a packing nub having a spring biased positioning pin for uniformly forming and molding grinding wheels. A locating pin at a bottom mold plate secures the liner to the bottom plate and indexes a threaded arbor and the nub to the pin. The positioning pin positions the nub to the arbor. Upon leveling a charge of a mixture of resin adhesive and abrasive material, a top plate is concentrically fitted to the nub and liner. The pressing of the top plate and nub with the bottom of the nub aligning with the bottom of the positioning pin provides uniform compaction. The liner supports the molded green wheel during curing and after which the wheel is removed.

12 Claims, 5 Drawing Sheets

५,६४५,७८३

APPARATUS AND METHOD FOR MOLDING GRINDING WHEELS

BACKGROUND OF THE INVENTION

The present invention relates to grinding wheels and, in particular, to improved molding apparatus that includes a mold liner for efficiently and uniformly forming the wheels prior to curing. The assembly also permits thermal curing the wheels within the mold liner to avoid extraneous handling operations.

Abrasive grinding wheels have long been used in the metal working industry to abrade and cut metal. Grinding wheels of various size, shape, thickness and compositions have been developed to accommodate a vast number of necessary grinding operations. One type of grinding wheel, known as a "cup wheel" is configured in the shape of a cup and has a recessed center depression which is axially aligned to a threaded arbor at the longitudinal center of the wheel. A sidewall surface tapers outwardly from an end surface which contains the arbor. The arbor mounts to a motorized spindle of the grinder.

Even though constructed in large volume, such wheels have traditionally and continue to be hand cast. That is, each wheel is molded through several hand operations to a compacted "green state". The green wheels, in turn, are removed from a forming mold, hand loaded and packed in sand curing trays, prior to being subjected to a programmed curing cycle in an appropriate curing furnace.

Difficulties encountered using known molding techniques arise through inconsistencies in wheel density that occur during placement of the nub which defines the center recess. Another, more critical, problem arises from misalignment of the arbor at a bottom mold plate due to dirt or sand that might exist beneath the arbor during either molding or curing. Misalignment can cause the wheel to oscillate, wobble and vibrate dangerously at speed, unless the grinding surface is trued to the arbor. Alternatively, the wheel must be discarded.

The molding apparatus of the present invention was developed to overcome the foregoing problems and others and provide an improved molding process having fewer hand operations that are less dependant on the worker. A mold liner and spring biased positioning pin were particularly developed to assure constant wheel density and arbor alignment.

The liners permit molding wheels which are not susceptible to the presence of dirt or sand beneath the arbor; which cure in approximately 30 to 36 hours versus 48 hours for conventionally molded, sand cured wheels; which can be immediately removed from the liners after curing, without requiring a cooling period; which do not require the removal of sand residue from the grinding surface; and which for metal backed wheels don't require the separate placement of paper barriers to prevent mixture materials from leaking through the backing piece during molding.

The positioning pin avoids inconsistencies in initial placement which can arise from placement of the nub by the molding operator. Such inconsistencies can lead to wheels of varying density in the region of the arbor.

SUMMARY OF THE INVENTION

It is accordingly a primary object of the present invention to provide a semi-automatic assembly and an improved method for molding abrasive grinding wheels.

It is a further object of the invention to provide molding apparatus having a mold liner which receives a pre-weighed charge of an adhesive resin and abrasive wheel material and which supports the arbor in a trued condition to the bottom mold plate.

It is a further object of the invention to provide a bottom mold plate having an alignment or locating pin which indexes the liner to the mold and a positioning pin at a recess forming nub to define proper compaction.

It is a further object of the invention to provide a nub having a positioning pin which is spring biased to support the nub at a predetermined displacement to the arbor and wherein the positioning pin axially travels in the nub during a compaction step until proper compaction is obtained.

It is a further object of the invention to provide a process wherein the green state wheels are cured within the mold liner.

Various of the foregoing objects, advantages and distinctions of the invention are obtained in a presently preferred molding assembly that includes a mold liner which is configured to the shape of a preferred grinding wheel. The liner is constructed of a thermally transmissive material and includes an aperture for indexing the liner to a forming mold. The liner may be coated with a wheel release material.

A bottom mold plate includes a centering or locating pin and to which the mold liner is concentrically supported. A threaded arbor of the grinding wheel is also concentrically supported to the centering pin within the mold liner. A nub which defines a recess at the grinding wheel includes a projecting positioning pin which contacts the arbor to displace the nub from the bottom of the liner. The positioning pin is spring biased to extend from the nub and axially travels within the nub during mixture compaction.

Upon filling the liner with a mixture of an abrasive material and a thermosetting resin, the mixture is leveled and a top molding plate is fitted about the nub. The mixture is compacted with a suitable press. During compaction, the mixture is compressed by the top plate and nub to a predetermined dimension, and a point where the nub aligns to the top of the arbor.

The green formed wheel and liner are removed from the work station and supported to a curing tray. The liner prevents slumping at the wheel before and during curing of the green wheel. Upon completing curing, the finished wheel is removed, the liner is cleaned and reused to form a new wheel.

Uniformly compacted grinding wheels are thereby obtained. The arbor is also molded in a trued condition to the bottom and grinding surfaces of the grinding wheel, which provides wheel having a true rotation at speed.

Still other objects, advantages and distinctions of the invention will become more apparent from the following description with respect to the appended drawings. The description should not, however, be literally construed in limitation of the invention. Rather, the invention should be interpreted within the broad scope of the further appended claims.

DESCRIPTION OF THE PREFERRED EMBODIMENT

Figure 1:
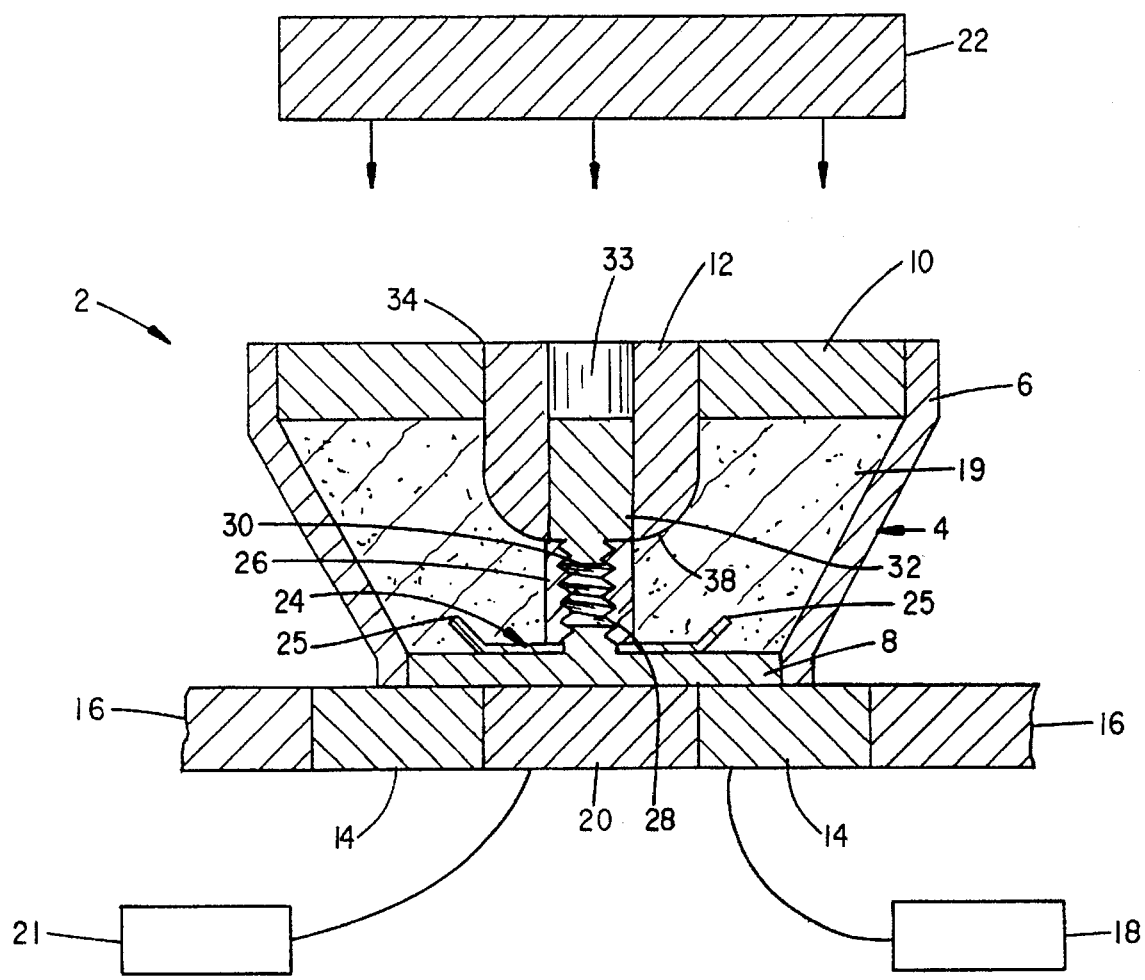
FIG. 1 is a cross section view through a conventional, prior art molding assembly in a compressed state.
Figure 2:
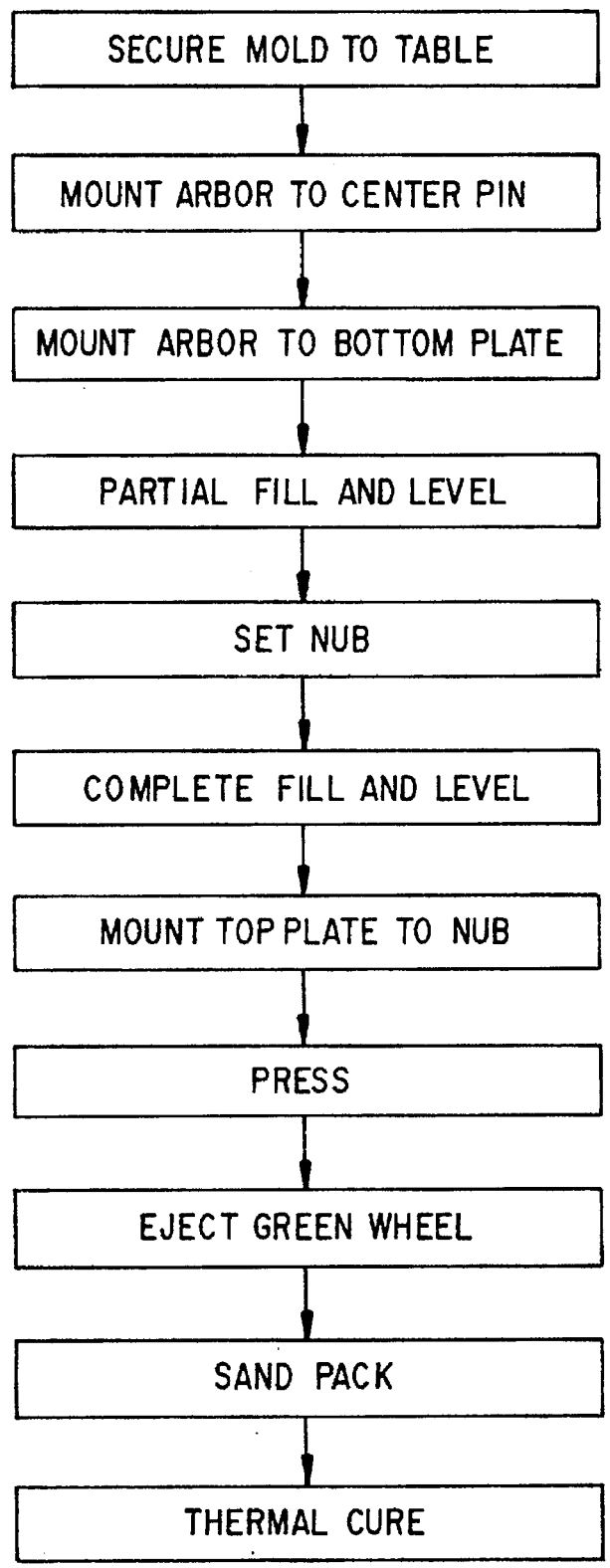
FIG. 2 is flow chart of the prior art molding process.

Referring to FIGS. 1 and 2, views are shown to a conventional molding assembly 2 and the process used to mold grinding wheels of the type constructed with the present invention. FIG. 1 is depicted in a compacted condition. The assembly 2 is particularly used to construct "cup" grinding wheels. The shape of the grinding wheel is determined by a mold 4 having a shell 6, a bottom plate 8, and a top plate 10. The plates 8 and 10 are detachable from the shell 6. A nub 12, which defines a recess at the grinding wheel, is concentrically supported to the top plate 10 with a centering pin 32, which is described in more detail below.

The mold 4 is supported to a rotary table 14 at a work station 16. A motor and belt drive linkage 18 are mounted to rotate the table 14 clockwise at speeds suitable for leveling the mixture, e.g. 50 to 75 rpm. A center platform 20 at the table 14 and cooperating pneumatic lift 21 are coupled to the table 14 to elevate the bottom plate 8 after a grinding wheel 19 is cast to a "green state". That is, after a pre-weighed mixture of thermosetting resin and abrasive material are added to the mold 4 and compressed with a press 22. A controller (not shown) selectively controls the operations of the motor 18, lift 21 and press 22.

Supported within the mold 4 is an arbor 24 that is molded into the grinding wheel 19. The arbor 24 is of conventional construction (i.e. a CP-11 or equivalent part number) and includes a number of bent wings 25 which are captured in the molded wheel 19. A threaded hub 26 of the arbor 24 is secured to a threaded stub 28 that projects from the center of the bottom plate 8. A threaded end 30 of a centering pin 32 is also secured to the arbor 24. The centering pin 32 projects to the approximate top of the mold 4 and supports the nub 12 at a bore 33 in the body of the nub 12. The nub 12 is thus free to vertically extend along the centering pin 32. The nub 12 is also concentrically supported to an aperture 34 of the top plate 10.

The nub 12 defines a hollow recess or cavity in the formed grinding wheel 19 that is aligned to the arbor 24. Once the top plate 10 is assembled to the shell 6, and which typically stands above the top surface 38 of the nub 12, the press 22 is engaged to force the top plate 10 and nub 12 into the mold 4 to compress the resin mixture to the point the mold closes with the press 22 striking to top of the shell 6 and where the nub surface 38 aligns with the hub 26.

A primary difficulty with the assembly 2 is the occasional tendency of the arbor 24 to become misaligned to the bottom plate 8. This can happen when dirt or granules of the abrasive mixture lodge beneath the arbor 24. Because the typical grinding wheel operates at speeds of 4000 to 7000 rpm, any misalignment can translate into dangerous oscillations at the wheel. Short of scrapping the grinding wheel 19, it is necessary to "true" the grinding surface of the wheel 19 into concentricity to the arbor 24, which is rather time consuming and costly.

With attention to FIG. 2 and in a typical molding operation, the shell 6 is fitted to the bottom plate 8 and both are mounted to the table 14. An arbor 24 is separately threaded to the centering pin 32 and the arbor 24 and bound centering pin 32 are secured to the stub 28 at the bottom plate 8. Approximately forty percent of a pre-weighed charge of a mixture of a conventional thermal setting resin and granular abrasive material are added to the shell 6. The table 14 is rotated and the mixture is leveled within the shell 4.

The nub 32 is fitted to the centering pin 32 and lowered until it rests on the mixture, slightly above the arbor 24. The remainder of the mixture is added to the shell 4 and re-leveled about the nub 32. The top plate 10 is next mounted about the nub 32 and a suitable pressure is applied to the top plate 10 and nub 32 with a hydraulic press press 22 to induce the nub 12 and surface 38 to align to the top of the hub 26. Stop limits or pressure reliefs are not typically placed on the press 22, although might be as desired.

The lift 21 and platform 20 at the center of the table 14 is activated to elevate the green wheel 19 from the shell 4. The nub 32 and top plate 10 are removed and the green wheel 39 is mounted in a curing tray, along with a number of other wheels 19. Sand is hand packed about the green wheels 19 to support the wheels 19 against slumping and provide a thermal transmissive media. The tray is next admitted to a curing oven and a controlled curing cycle for a suitable duration.

Upon removal from the oven, each wheel is separately mounted to a test station. Sand residue is first removed from the wheel surfaces. Each wheel 19 is then rotated to speed to confirm dynamic balance. Wheels which unduly oscillate are discarded.

Alternatively, defective wheels can be trued by abrading the sidewall grinding surface of the wheel to align or true the grinding surface to the arbor 24. Such an operation requires a separate work station. In some operations, all wheels are subjected to a truing step.

Figure 3:
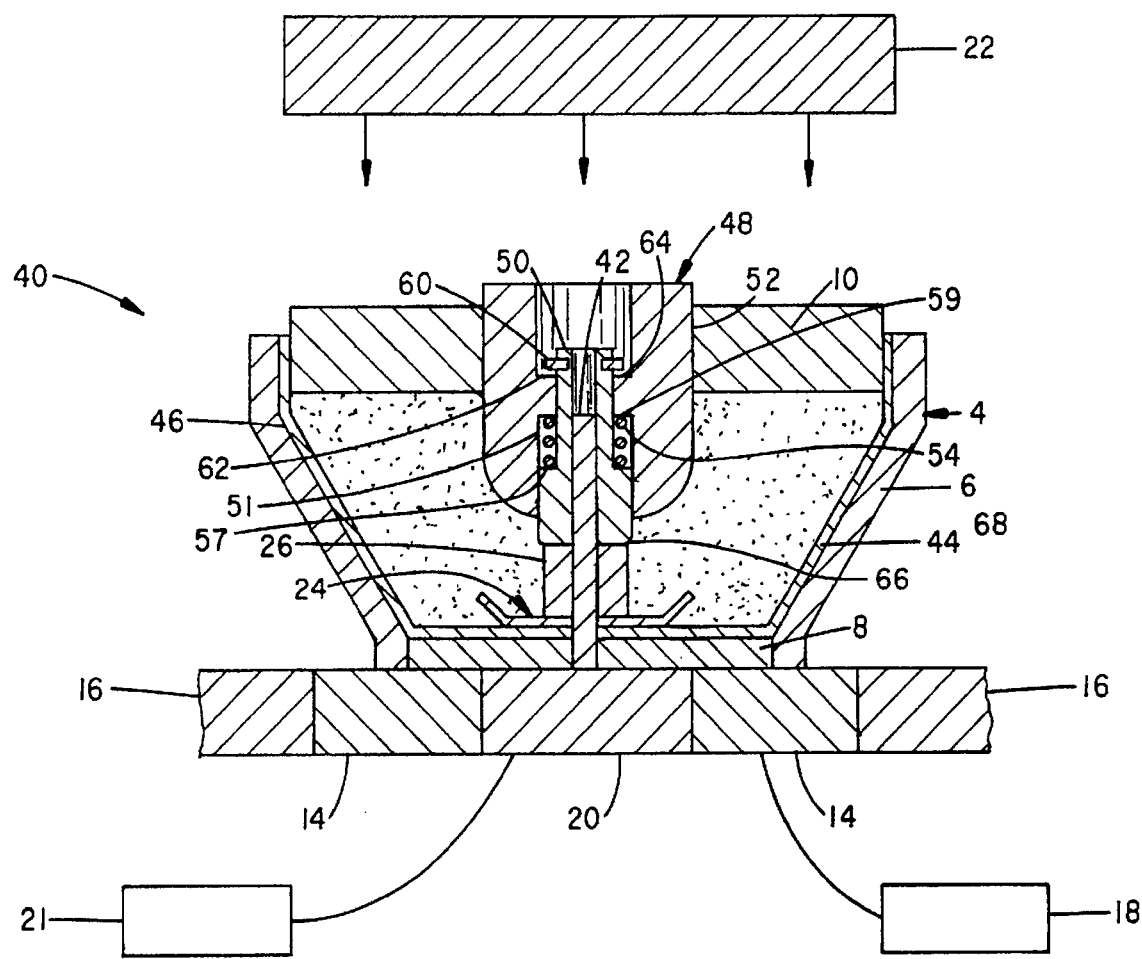
FIG. 3 is a cross section view through the molding assembly of the invention in an uncompressed state.
Figure 4:
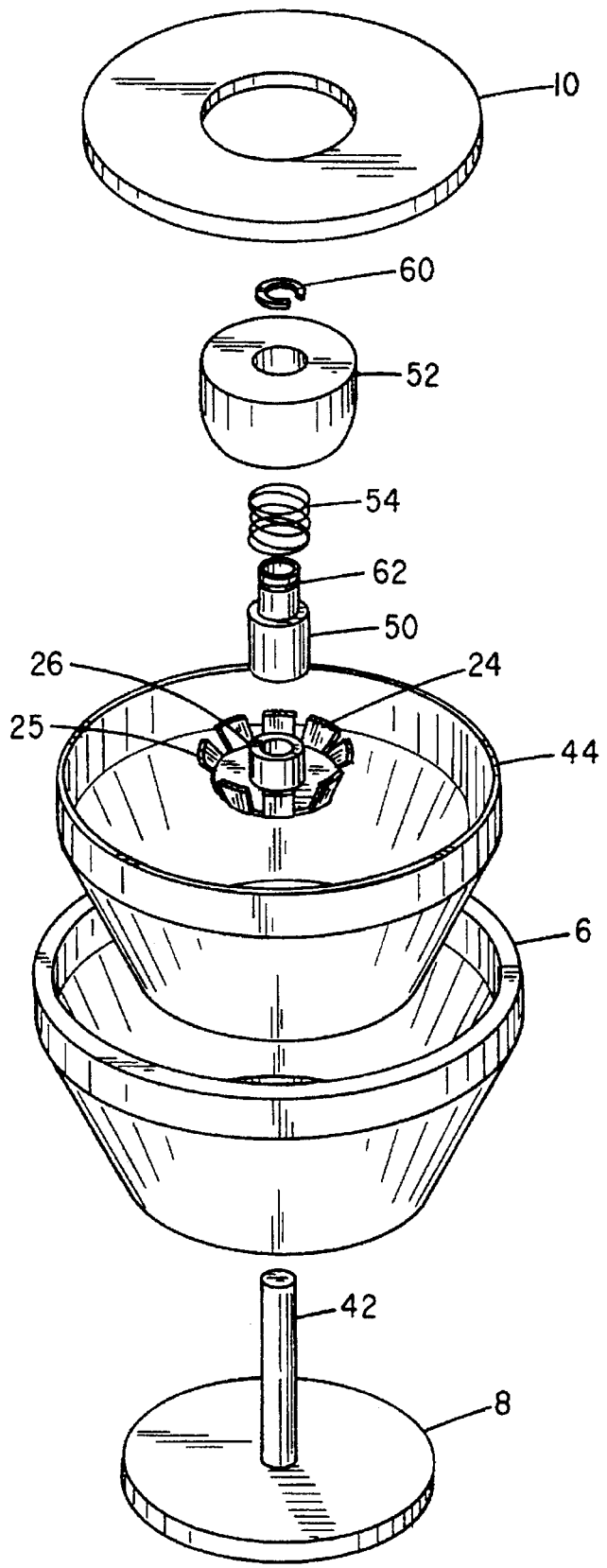
FIG. 4 is a perspective drawing shown in exploded assembly to the molding assembly of the invention.
Figure 5:
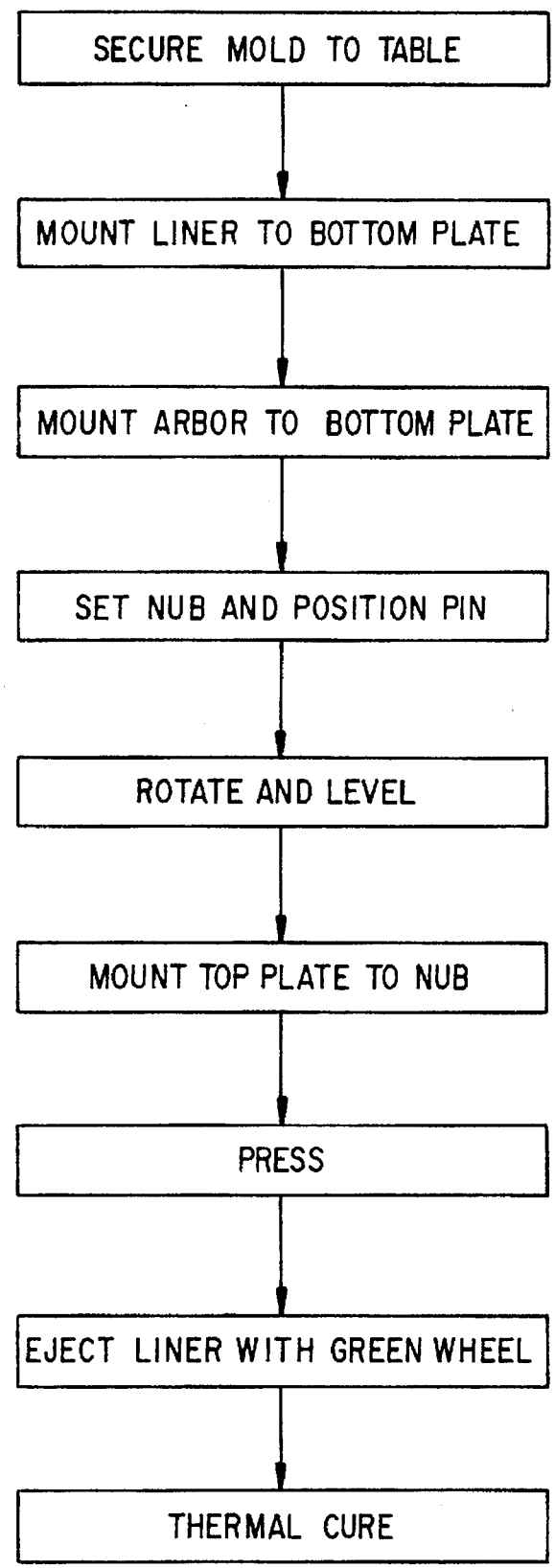
FIG. 5 is a flow chart of a molding process used with the molding assembly of the invention.

FIGS. 3 through 5 depict an improved molding assembly 40 of the invention. The assembly 40 reduces the hand operations of the forming and molding process for grinding wheels and provides a mechanism for assuring uniform compaction at each wheel. FIGS. 3 and 4 depict the assembly 40 in uncompressed, assembled and exploded assembly conditions. FIG. 5 depicts the improved molding process obtained with the assembly 40.

The assembly 40 includes the mold 4 and the integral shell 6, bottom plate 8 and top plate 10. The bottom plate 8 is fitted with a cylindrical, smooth walled locating pin 42 which projects into the shell 6 to a height short of the maximimum compression of the top plate 10. Mounted about the locating pin 42 is a mold liner 44 that is shaped to conform to the internal surface 46 of the shell 6. The liner 44 is constructed of a metal or other thermally transmissive material. Presently, the liner 44 is formed of steel which is processed to accommodate a longer work life. A variety of other metals, heat resistant plastic or other permanent materials may be used. Cardboard or various disposable materials may also be used to form the liner. The liner 44 may also be coated with a release material, such as teflon or a mold release material which are tolerant to the molding and curing temperatures yet facilitate the release of the cured wheel from the liner 44.

With the mounting of the liner 44 to the locating pin 42, an arbor 24 is mounted over the pin 42 and set on the liner 44. Misalignment of the arbor 24 is prevented by the locating pin 42 and the clean condition of the liner 44, which is assured with the mounting of the liner 44 to the locating pin 42, and which assures that stray granules are not present to tip or misalign the arbor 24 relative to the bottom of the liner 44.

An improved nub 48 is next mounted to the locating pin 42. The nub 48 includes a positioning pin 50 which is supported at a bore 51 in the body 52 of the nub 48. A spring 54 mounts about the pin 50 to bias the positioning pin 50 to extend from the body 52. A snap ring 60 mounts to a groove 62 in the positioning pin 50 and seats against a flange surface 64 in the body 52 to retain the pin 50 to the body 52. Upon mounting the nub 48 to the locating pin 42, a bottom surface 66 of the positioning pin 50 engages the arbor 24 to elevate the body 52 to a preferred height. The positioning pin 50, however, is free to axially move within the bore 51 during the compaction step of the molding operation. With complete compaction of the mixture, a bottom surface 68 of the nub 48 is brought into registry with the hub 26. The spring 54 may also be mounted in the body 52 to extend from a channel such that the surface 57 of the positioning pin 50 can bottom out against the surface 59 in the body 52, when the surface 68 is aligned to the hub 26, to provide a stop limit to the press action.

With attention to FIG. 5, during molding and with the mounting of the liner 44 and arbor 24 to the locating pin 42, the entire quantity of pre-weighed mixture is admitted to the liner 44 and leveled about the nub assembly 48. The top plate 10 is fitted about the body 52 and the press 22 is engaged to contact the top plate 10 and body 52. As the top plate 10 and body 52 are pressed into the mixture, the body 52 slides along the positioning pin 50, until the press 22 contacts the shell 6, which occurs short of the point where the positioning pin 50 bottoms in the body 52, and the surface 68 is in registry with the hub 26 and the surface 66 of the positioning pin 50. At this point, a uniform compaction is assured. The positioning pin 50, as mentioned above, might alternatively be mounted to the body 52 to provide a stop limit to the press 22 in lieu of the shell 6.

The lift 20 is next elevated to eject the liner 44 and green wheel 19 from the shell 6. The top plate 10 and nub assembly 48 are removed and the liner 44 and green wheel 19 are arranged at a curing tray (not shown). Sand is no longer packed about the green wheels 19, since the liner 44 provides desired thermal transmission. The liner 44 continues to support the green wheel 19 against possible slumping which might occur before or during curing.

With the use of the liner 44 and the improved nub assembly 48 numerous advantages are obtained, in particular, misalignment of the arbor 24 is avoided. Testing for trueness need now be only performed occasionally. It is no longer necessary to remove sand residue from the cured wheels nor clean curing trays. Curing times are reduced from 48 hours to 30 to 36 hours. Uniform compaction of the wheel mixture is also obtained.

While the invention has been described with respect to a preferred construction, still other constructions may be suggested to those skilled in the art. The foregoing description should therefore be construed to all those embodiments within the spirit and scope of the following claims.

What is claimed is:

1. Apparatus for molding a grinding wheel from an abrasive mixture into concentric registry with an arbor, comprising:

a) a liner for containing a quantity of the abrasive mixture;
   b) a mold having a shell, a bottom plate and a top plate, wherein said bottom and top plates mount to said shell, and wherein said bottom plate includes locater means for locating said liner within said shell and said arbor within said liner;
   c) nub means mounted to said locater means for defining a recess in the grinding wheel and having positioner means for displacing a surface of said nub means a predetermined distance from said arbor;
   d) a top mold plate which mounts to said shell and includes means for locating said nub means to said top plate; and
   f) means for pressing said top plate and nub to compact said mixture.

2. Apparatus as set forth in claim 1 including a locating pin which projects from said bottom plate into the shell and wherein said liner mounts to said locating pin.

3. Apparatus as set forth in claim 2 wherein said nub means comprises a body having a first bore and a positioning pin having a second bore, wherein said positioning pin mounts within said first bore and said positioning pin mounts at said second bore to said locating pin.

4. Apparatus as set forth in claim 3 including means for resiliently biasing said positioning pin within said first bore such that said positioning pin is axially moveable within the body.

5. Apparatus as set forth in claim 4 wherein the resilient biasing means comprises a spring and means for retaining said spring to axially extend and retract said positioning pin from said body.

6. Apparatus as set forth in claim 1 wherein said liner exhibits a shape that complements an interior surface of said shell.

7. Apparatus as set forth in claim 6 wherein said liner includes a release coating.

8. Apparatus as set forth in claim 1 wherein said positioning means includes a positioning pin and means for constraining said nub to extend and retract along the positioning pin from a first position at said predetermined displacement to a second position where a predetermined compaction of said mixture is obtained.

9. Apparatus for molding a grinding wheel from an abrasive mixture into concentric registry with an arbor, comprising:

a) a liner for containing a charge of an abrasive mixture;
   b) a mold housing having a shell, a bottom plate and a top plate, wherein said bottom and top plates mount to said shell, wherein said bottom plate includes a locating pin which projects co-axial to a longitudinal center axis of said shell, wherein said locating pin mounts through a bore of said arbor, and wherein said top plate includes an aperture;
   c) a nub having a body containing a bore and a positioning pin mounted within the bore of said body, wherein said positioning pin includes a bore which receives said locating pin, wherein said positioning pin axially extends and retracts within said body between first and second positions, and wherein said nub mounts within the aperture of said top plate; and
   d) means for pressing said top plate and nub to compact said mixture.

10. Apparatus as set forth in claim 9 including means for biasing axial movement of said positioning pin between said first and second postions within said body.

11. A method for molding a grinding wheel from an abrasive mixture into concentric registry with an arbor, comprising:

a) mounting a mold having a bottom wall and sidewalls, which define a mold cavity, to a rotating molding table;
   b) supporting a liner to a locating pin which projects from the bottom wall;

c) supporting the arbor to the locating pin;

d) supporting a nub means for defining a recess in a cast wheel in contact with said locating means;

e) adding the abrasive mixture to said liner;

f) leveling said mixture about said nub means;

g) mounting a top plate about said nub means and compacting said mixture;

h) ejecting said liner and compacted mixture from said mold; and i) thermal curing said mixture to a final form; and j) removing the molded wheel from said liner.

12. A method as set forth in claim 11 wherein said nub means comprises a body containing a bore and a positioning pin mounted within the bore of said body, wherein said positioning pin includes a bore which receives said locating pin, wherein said positioning pin axially extends and retracts within said body, and wherein said nub mounts within an aperture of said top plate.

* * * * *